United States Patent
Ginart et al.

(10) Patent No.: US 11,462,911 B2
(45) Date of Patent: Oct. 4, 2022

(54) DETECTION AND MITIGATION OF DC INJECTION ON THE POWER GRID SYSTEM

(71) Applicant: Smart Wires Inc., Union City, CA (US)

(72) Inventors: Antonio Ginart, Santa Clarita, CA (US); Shreesha Adiga Manoor, Milpitas, CA (US); Mahsa Ghapandar Kashani, Millbrae, CA (US); Hamed Khalilinia, Hayward, CA (US); Haroon Inam, San Jose, CA (US); Amrit Iyer, Oakland, CA (US); Govind Chavan, Fremont, CA (US); Niloofar Torabi, Menlo Park, CA (US)

(73) Assignee: Smart Wires Inc., Union City, CA (US)

( * ) Notice: Subject to any disclaimer, the term of this patent is extended or adjusted under 35 U.S.C. 154(b) by 193 days.

(21) Appl. No.: 16/814,623

(22) Filed: Mar. 10, 2020

(65) Prior Publication Data

US 2020/0328598 A1      Oct. 15, 2020

Related U.S. Application Data

(60) Provisional application No. 62/831,595, filed on Apr. 9, 2019.

(51) Int. Cl.
*H02J 3/26* (2006.01)
*H02J 3/01* (2006.01)
(Continued)

(52) U.S. Cl.
CPC .................. *H02J 3/26* (2013.01); *H02J 3/01* (2013.01); *H02J 3/38* (2013.01); *H02J 13/00009* (2020.01); *H02M 7/4803* (2021.05); *H02M 7/49* (2013.01)

(58) Field of Classification Search
CPC ........ H02J 3/26; H02J 3/01; H02J 3/38; H02J 13/00009; H02M 7/4803; H02M 7/49; Y02B 90/20; Y02E 40/50; Y04S 40/121
See application file for complete search history.

(56) References Cited

U.S. PATENT DOCUMENTS

| 3,571,494 A | * | 3/1971 | Law | ...................... H04N 11/02 348/426.1 |
| 4,013,859 A | * | 3/1977 | Peters, Jr. | .............. H05B 6/062 219/626 |

(Continued)

FOREIGN PATENT DOCUMENTS

| CN | 103399200 B | 12/2015 |
| WO | 2004/013951 A2 | 2/2004 |

(Continued)

OTHER PUBLICATIONS

Office Action dated Aug. 24, 2021; U.S. Appl. No. 16/814,647 (11 pp. total).

(Continued)

*Primary Examiner* — Ziaul Karim
(74) *Attorney, Agent, or Firm* — Womble Bond Dickinson (US) LLP (57) ABSTRACT

The presence of injected DC has harmful consequences for a power grid system. A piecewise sinusoidal ripple voltage wave at the line-frequency that rides on the main capacitor bank of the power converter is observed. This observation leads to a new detection method and mitigation method. A two-stage control circuit is added to the operation of a power converter that controls power line impedance in order to mitigate the injected DC and to block DC circulation. This control computes a correction angle to adjust the timing of generated pulsed square waves to counter-balance the ripple. A functional solution and the results of experiments are presented. Furthermore, an extraction method and three (Continued)

Detection Methods for DC Injection Problem elimination methods for this ripple component are presented to allow dissipation of DC energy through heat and/or electronic magnetic wave, or to allow transformation of this energy into usable power that is fed back into the power grid.

18 Claims, 13 Drawing Sheets

(51) Int. Cl.
*H02J 13/00* (2006.01)
*H02J 3/38* (2006.01)
*H02M 7/49* (2007.01)
*H02M 7/48* (2007.01)

(56) References Cited

U.S. PATENT DOCUMENTS

| | | | |
|---|---|---|---|
| 4,068,159 | A | 1/1978 | Gyugyi |
| 5,179,489 | A * | 1/1993 | Oliver ................. G05F 3/04 361/111 |
| 6,282,104 | B1 | 8/2001 | Kem |
| 7,117,070 | B2 | 10/2006 | Chow et al. |
| 7,615,989 | B2 | 11/2009 | Kojori |
| 7,787,267 | B2 | 8/2010 | Wu et al. |
| 8,964,427 | B2 | 2/2015 | Kerkman et al. |
| 9,396,866 | B2 | 7/2016 | Ramirez |
| 9,450,410 | B2 | 9/2016 | Moore et al. |
| 9,753,059 | B2 | 9/2017 | Kreikebaum et al. |
| 9,906,031 | B2 | 2/2018 | Ramsay et al. |
| 10,075,016 | B2 | 9/2018 | Wilkins et al. |
| 2004/0196675 | A1* | 10/2004 | Cope ................. H02M 1/14 363/39 |
| 2007/0007969 | A1 | 1/2007 | Dai et al. |
| 2007/0159858 | A1* | 7/2007 | Spindler ................. H02J 9/062 363/37 |
| 2010/0105259 | A1* | 4/2010 | Wejrzanowski ....... B63H 21/17 318/400.23 |
| 2012/0112702 | A1* | 5/2012 | Steigerwald ............ B60L 50/40 320/137 |
| 2012/0140533 | A1* | 6/2012 | Li ........................... H02J 3/381 363/37 |
| 2013/0033907 | A1* | 2/2013 | Zhou ........................ H02J 3/01 363/37 |
| 2013/0058144 | A1 | 3/2013 | Hiramatsu et al. |
| 2017/0235286 | A1 | 8/2017 | Inam et al. |
| 2018/0054140 | A1 | 2/2018 | Chen et al. |
| 2018/0145504 | A1* | 5/2018 | Kovan .................. H02H 9/042 |

FOREIGN PATENT DOCUMENTS

| | | |
|---|---|---|
| WO | 2004/013951 A3 | 10/2004 |
| WO | 2015/139743 A1 | 9/2015 |

OTHER PUBLICATIONS

Buticchi, Giampaolo, et al., "Active Filter for the Removal of the DC Current Component for Single-Phase Power Lines", IEEE Transactions on Industrial Electronics, Oct. 2013, vol. 60, No. 10, Oct. 2013, Abstract 2 pages total.
LEM USA, INC., "Current Transducer LF 1010-S/SPA5", Mar. 20, 2018, 7 pages total.
Molinski, Tom S., "Shielding grids from solar storms", IEEE Spectrum, Nov. 2000, pp. 56-60.
Tamura Corporation of America, "Closed loop Hall Effect Sensors", Oct. 2018, 16 pages total.
Extended European Search Report dated Jun. 2, 2020; European Patent Application No. 20168791.0; 9 pages total.
Office Action dated May 17, 2021; U.S. Appl. No. 16/814,647 (19 pp. total).
Notice of Allowance dated Dec. 20, 2021; U.S. Appl. No. 16/814,647 (13 pp. total).

* cited by examiner

Figure 1. Detection Methods for DC Injection Problem

- Fourier decomposition
- I(t)= I $_{DC}$ + I$_L$ cos (ωt+δ)
- To compute the Voltage in the capacitor by superposition
- $V_C\,(t) = 1/C \int\, \text{I(t)}\, dt$
- $Vc_{DC}\,(t) = \int I_{DC}\, dt$
- $Vc_{AC}\,(t) = \int\, \text{I}_L \cos\,(\,\omega t + \delta)\, dt$ Figure 2. Fourier transformation decomposition model for the DC injection component Figure 3. Superposition of the DC injection component on the capacitor voltage Figure 4. The four timings of a generated pulsed square wave Figure 5A. Correction angle computation and pulsed square wave generation Figure 5B. DC-Blocking Process Flow Diagram Figure 6. Line current before DC injection, during DC injection and after mitigation control is applied Figure 7A. Pulsed square wave voltage output and line current output before DC injection mitigation Figure 7B. Pulsed square wave voltage output and line current output after DC injection mitigation Figure 8. Mitigation and Elimination Methods for DC Injection Problem Figure 9. Extraction of the DC component and dissipated through a resistor as heat Figure 10. Extraction of DC component and dissipated through a RF Amplifier as EM Wave Figure 11. Transformation of the DC injection component into usable energy

DETECTION AND MITIGATION OF DC INJECTION ON THE POWER GRID SYSTEM

CROSS REFERENCE TO RELATED APPLICATIONS

This application claims the benefit of U.S. Provisional Application No. 62/831,595 filed on Apr. 9, 2019, the disclosure of which is incorporated herein by reference.

TECHNICAL FIELD

Embodiments of the present disclosure relate generally to power distribution systems. More particularly, embodiments of the disclosure relate to systems and methods of detection, mitigation and elimination of DC components present in a power distribution system.

BACKGROUND

Three-phase alternating current (AC) is a common form of electric power generation, transmission, and distribution. It is the most common method used by electrical grids worldwide to transfer power. The efficiency of the power grid depends heavily on the balance of the three phases and is very susceptible to injected direct current (DC).

Modern-day distributed generation introduces multi-generator grids and new modes of operation. These new modes of operation will likely introduce power electronic (PE) converters, such as impedance injection modules, on a large scale at the low- and medium-voltage levels. DC injection into the AC grid is a threat from grid-connected PE converters that are not structured to handle this issue.

The invention described herein builds on the core architecture, especially the series power reactor/converter, disclosed in U.S. Pat. No. 9,906,031 "Power line reactance module and applications." This document focuses only on those functionalities that are new and additional to the core architecture therein.

Some DC injection problems from external sources require special consideration, including the geomagnetically induced currents (GICs). It has been well known for more than 60 years that electric utilities in northern latitudes can have GICs flowing in their transmission lines and transformer ground points and that these GICs are caused by geomagnetic storms often associated with solar flares. It was realized only in the last 50 years that large GICs can become problematic in the power system and even severe enough to cause a complete system shutdown. Utilities susceptible to GIC cannot rely on luck that a geomagnetic storm will not affect them, or if it does, that the loading conditions at the time will allow enough margins to ride through it.

The DC injection problem becomes more prevalent as multilevel converters, sometimes known as impedance injection modules, are introduced to manage the efficiency of transmission line power flow in recent decades. This transformer-less flexible alternating current transmission system (TL-FACTS) provides a unique capability to adjust the power impedance to minimize power loss in the power delivery process. New problems, including DC injection, are introduced as it is connected in series with the power line without the benefit of a transformer's galvanic isolation.

A DC component can cause the magnetic core saturation of distribution power transformers. Transformers operating under saturation conditions present increased power losses, overheating, and distorted current waveforms. Accordingly, the invention described herein presents a new detection and control method to mitigate the harmful effects of DC injection in general and GIC in particular. Three elimination methods for energy comprising the injected DC are also presented to provide relief to the utilities.

SUMMARY

Disclosed herein is an apparatus used to mitigate DC injected into a power line carrying an AC. In one embodiment, the apparatus includes a detector circuit used to detect the DC on the power line. The apparatus also includes a two-stage pulsed square wave generator used to generate a train of pulsed square waves. Each cycle of the pulsed square waves includes a positive-going square wave and a negative-going square wave. The two-stage pulsed square wave generator adjusts the timing of the positive-going square wave and the timing of the negative-going square wave in each cycle based on the direction and the magnitude of the detected DC to counter-balance the DC injected into the power line.

Disclosed herein is also a method by a power converter for mitigating DC injected into a power line carrying an AC. The method includes detecting, by the power converter, the DC on the power line. The method also includes generating, by the power converter, a train of pulsed square waves. Each cycle of the pulsed square waves includes a positive-going square wave and a negative-going square wave. The method further includes adjusting the timing of the positive-going square wave and the timing of the negative-going square wave in each cycle based on the direction and the magnitude of the detected DC. The method further includes applying, by the power converter, the train of pulsed square waves to the power line to counter-balance the DC injected into the power line. The terms "power converter," "voltage converter," and "converter" may be used interchangeably in the description that follows unless specifically noted otherwise.

BRIEF DESCRIPTION OF THE DRAWINGS

The accompanying drawings are provided together with the following description of various aspects and embodiments of the subject technology for a better comprehension of the invention. The drawings and the embodiments are illustrative of the invention, and are not intended to limit the scope of the invention. It is understood that a person of ordinary skill in the art may modify the drawings to generate drawings of other embodiments that would still fall within the scope of the invention.

DETAILED DESCRIPTION

Examples of various aspects and variations of the subject technology are described herein and illustrated in the accompanying drawings. Objects, features, and advantages of the invention will be apparent from the following detailed description taken in conjunction with the accompanying drawings. While various embodiments of the subject technology are described, the following description is not intended to limit the invention to these embodiments, but rather to enable a person skilled in the art to make and use this invention.

The presence of injected DC has harmful consequences for a power grid system. A piecewise sinusoidal ripple voltage wave at the line-frequency that rides on the main capacitor bank of the power converter is observed. This observation leads to a new detection method and mitigation method. A two-stage control circuit is added to the operation of a power converter that controls power line impedance in order to mitigate the injected DC and to block DC circulation. This control computes a correction angle to adjust the timing of generated pulsed square waves to counter-balance the ripple. A functional solution and the results of experiments are presented. Furthermore, an extraction method for this ripple component is presented to allow dissipation of DC energy through heat and/or electromagnetic wave, or to allow transformation of this energy into usable power that is fed back into the power grid.

Figure 1:
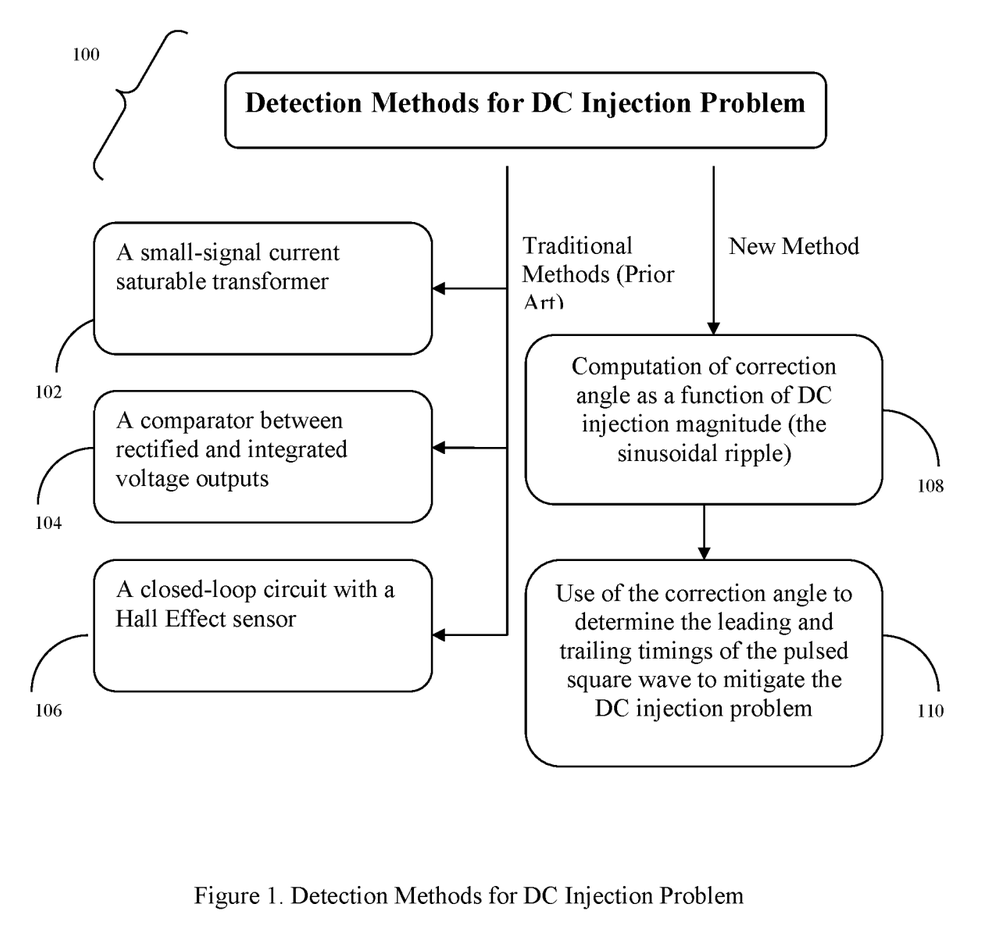
FIG. 1 provides a simple taxonomy of detection methods for the DC injection problems with a particular focus on the new method in this application.

Traditional methods to detect DC injection in the power grid, as shown in FIG. 1, include a design based on small-signal current saturable transformer 102, or a design based on comparing positive and negative voltages after being rectified and integrated 104, or a design based on closed-loop circuit with Hall Effect sensor 106. These are all well understood prior art examples in the field.

A piecewise sinusoidal ripple voltage at the line-frequency that rides on the main capacitor bank of the power converter can be observed when DC injection is present. This ripple component observation leads to a new control method. A control circuit is added to the existing power converter design to mitigate DC injection and block DC circulation. A correction angle is computed as a function of the DC injection magnitude 108. The computed correction angle is then used to adjust the timings of a generated pulsed square wave to counter-balance the ripple to mitigate DC injection 110. This ripple component can also be extracted and processed. Those methods will be discussed later in this section.

Figure 2:
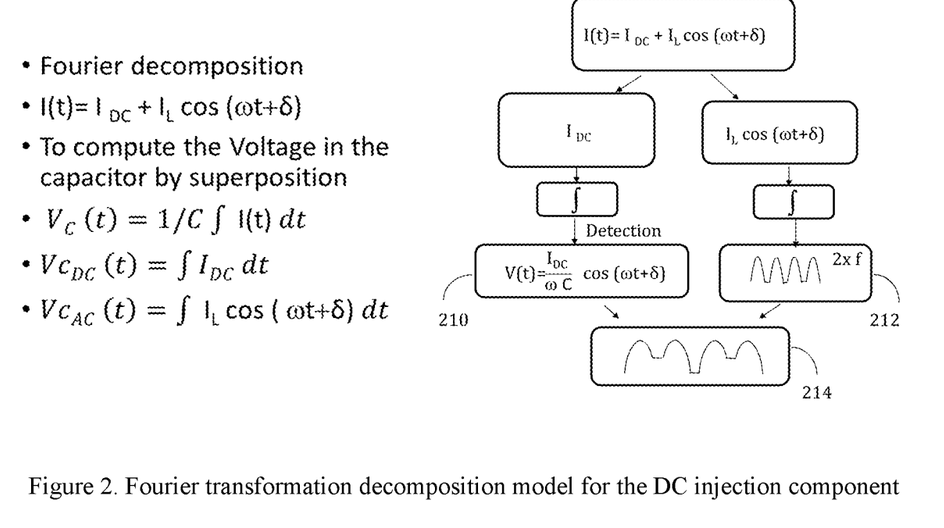
FIG. 2 shows the Fourier transformation decomposition model for the DC injection component.

FIG. 2 shows a model based on Fourier transformation decomposition for this new observation. The voltages can be integrated separately and then summed together as shown. The DC component, when getting integrated into a voltage component, is manifested as a line-frequency piecewise sinusoidal wave 210. This voltage component is then superposed onto the capacitor voltage, shown as twice the line-frequency (2×f) wave 212. The resultant superposition is shown in 214. The implementation of the scheme could be done with a simple band-pass filter or low-pass filter.

Figure 3:
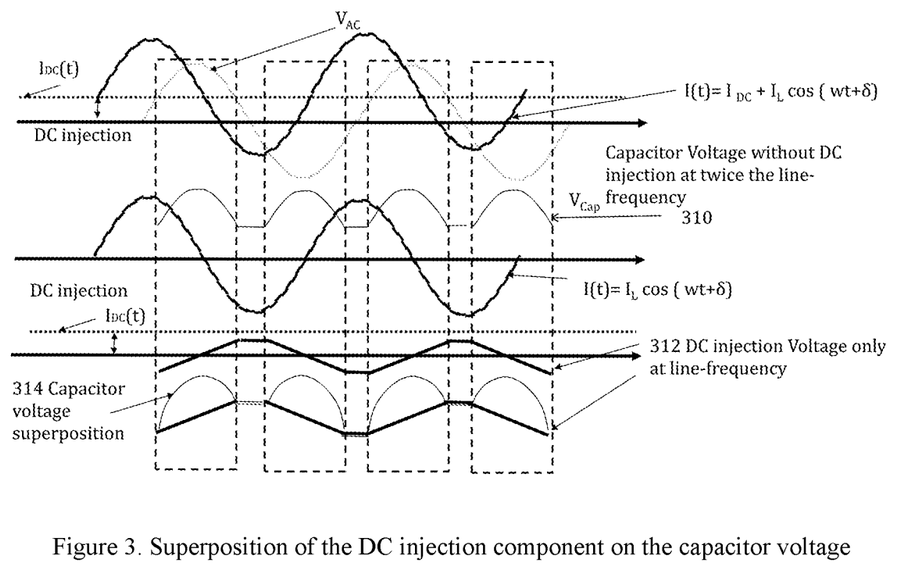
FIG. 3 shows the superposition of the DC injection component on the coupling capacitor's voltage waveform.

FIG. 3 shows superposition in terms of waveforms, which complements the Fourier transformation decomposition model in FIG. 2. The capacitor voltage $Vca_p$ without the DC component superposed is shown by label 310. The DC component, after being integrated into voltage is shown by label 312. The superposed voltage is shown by label 314.

Figure 4:
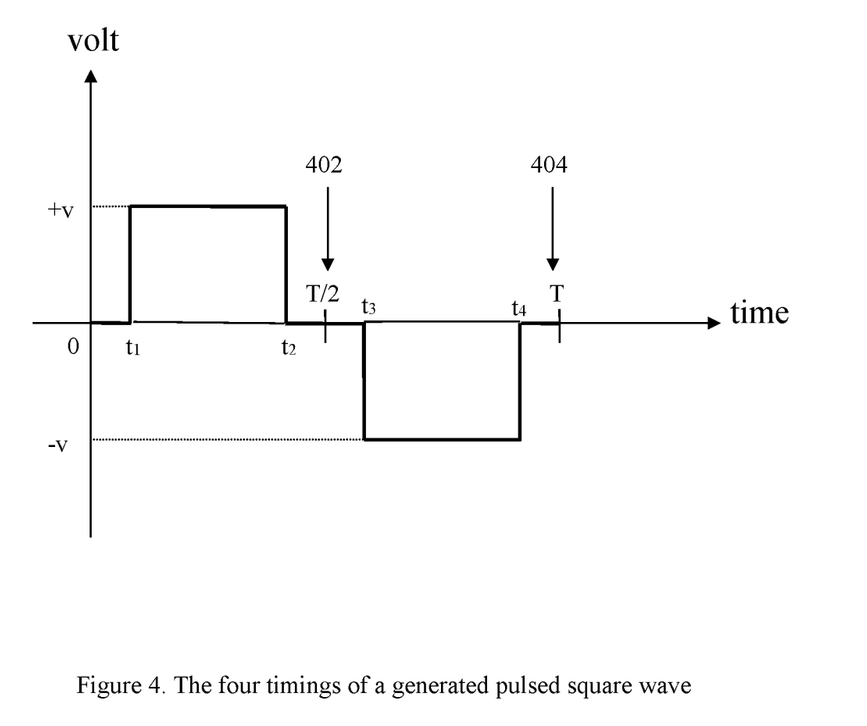
FIG. 4 shows a simplified timing diagram of the generated pulsed square wave to compensate for the DC injection.

A pulsed square wave is typically the input to drive a full-wave quad-IGBT (insulated-gate bipolar transistor) DC-AC converter/inverter in the power electronics design. An example of this full-wave quad-IGBT DC-AC converter is shown on the right-hand side of FIG. 9. In FIG. 4, the required timings, $t_1$, $t_2$, $t_3$ and $t_4$, are shown for the pulsed square wave. The period T for the full cycle 404 and T/2 for the half-cycle 402 is noted in the FIG. 4. Normally, $t_1$ and $t_2$ are symmetric in the first positive-going half-cycle, and $t_3$ and $t_4$ are symmetric in the second negative-going half-cycle. Depending on the magnitude and direction of the DC injection, these timings are computed and the differences between $[t_2-t_1]$ and $[t_4-t_3]$ can control the positive-going and negative-going cycles for the converter and the power line to counter-balance the DC injection ripple.

Note that this detection and mitigation circuit can be running at all times, including the normal operations when there is no DC injection problem. If the ripple component is negligible, the correction angle will be zero and there will be no changes in the leading and trailing timings on the regular output of the pulsed square wave. This control can automatically engage, if configured as such, when DC injection is present and the correction angle will be recomputed continuously and the timings will be adjusted on every pulsed square wave cycle.

Figure 5A:
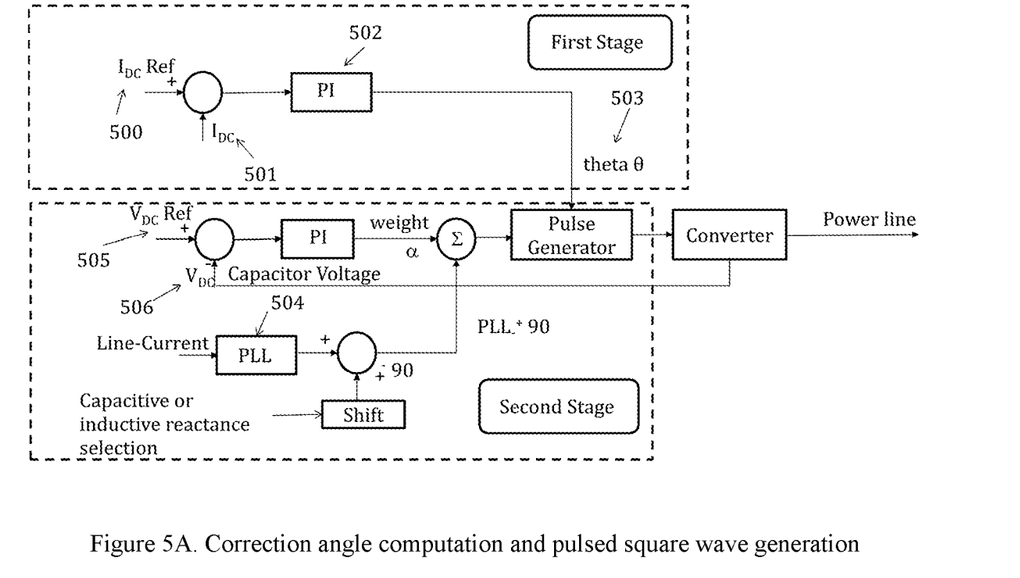
FIG. 5A depicts a circuit block diagram that computes the correction angle as a function of DC injection and then applies the correction angle computation to generate a pulsed square wave for the converter.

An example two-stage control circuit to mitigate this DC injection problem is presented in FIG. 5A. The first stage is shown in the upper block of FIG. 5A, where the line current $I_{DC}$ 501 is used directly to compute the correction angle theta $\theta$.

This correction angle computation block compares the DC current in the line $I_{DC}$ 501 with a reference $I_{DC}$ Ref value 500 and then uses a proportional integrator (PI) controller 502 to compute the correction angle theta $\theta$ 503 for the pulsed square wave generator. This $I_{DC}$ Ref value 500 is set to zero in this implementation, but can be set differently for new applications. This correction angle is then fed to the second stage circuit in the lower block of FIG. 5A to generate the required timings for the pulsed square wave.

The second stage circuit, that is, the pulsed square wave generation block, works as follows. The voltage across the coupling capacitor $V_{DC}$ 506 is first compared with a reference $V_{DC}$ Ref voltage 505 and fed into a proportional integrator (PI) controller to be added later with a weighting factor $\alpha$. A phase-locked loop (PLL) circuit 504 locks on the line current with the shift input (leading or lagging phase), that is, capacitive or inductive reactance selection, and is then added with the output of the previously-mentioned PI output to determine the frequency and amplitude of the pulsed square wave. The timing adjustment on the leading and trailing edges come from the correction angle theta $\theta$. This correction angle normally ranges from 0 to 90 degrees. With the boundary conditions, when the correction angle is zero degree, the pulsed square wave has no timing adjustments for the leading and trailing edges. That is, the pulsed square wave is not modified. When the correction angle is 90 degrees, the timing adjustments completely eliminate the corresponding half of the square wave.

Figure 5B:
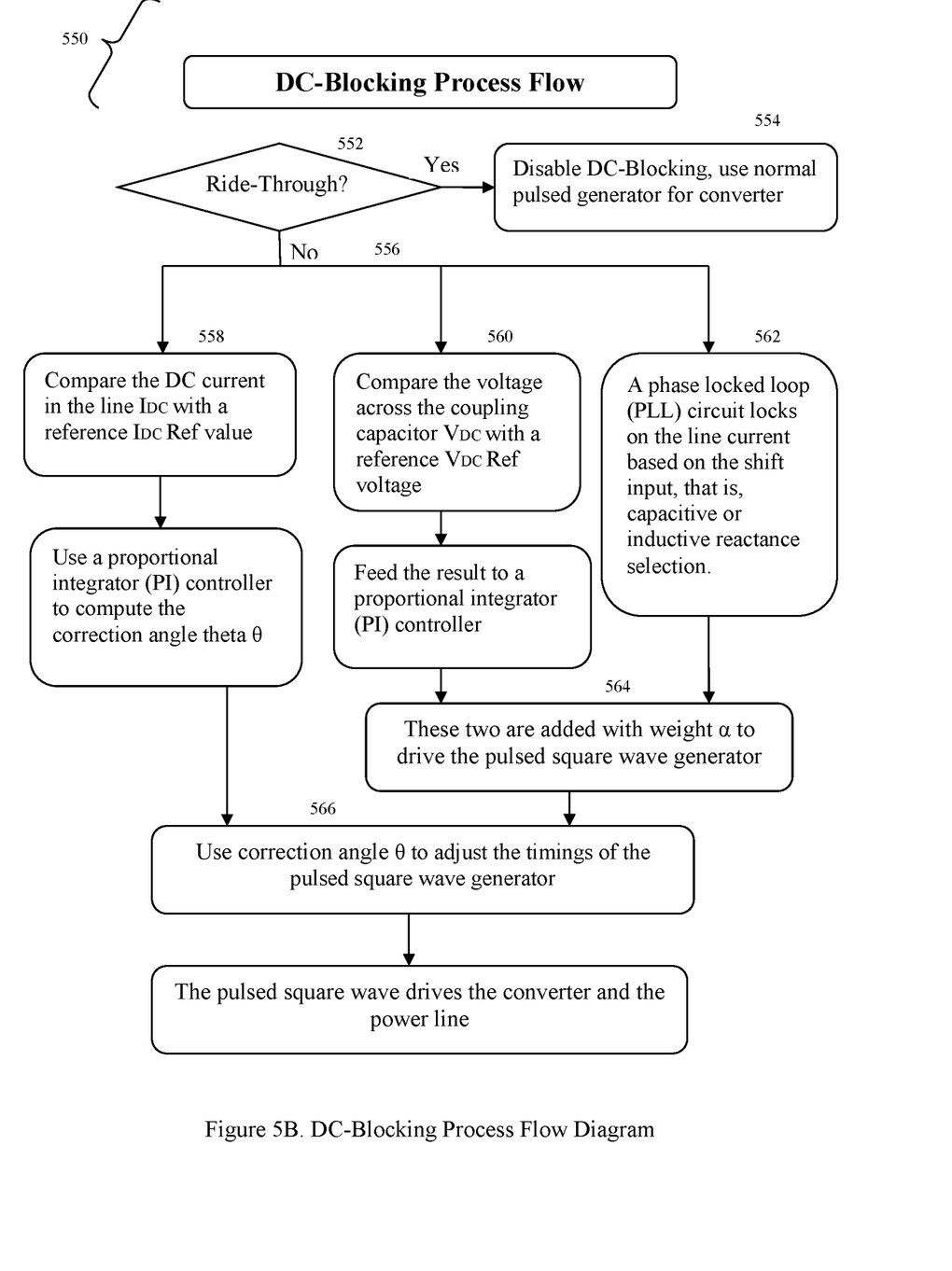
FIG. 5B provides the process flow of the two-stage mitigation control circuit depicted in FIG. 5A.

FIG. 5B complements the mitigation control circuit diagram in FIG. 5A with a process flow diagram 550. Depending on the configuration setting 552 for "ride-through" feature, the process can either disable the so-called DC-Blocking capability 554, that is, the mitigation control circuit, or enable the DC-Blocking 556 with the two-stage control circuit in FIG. 5A. In one embodiment of the "ride-through" mode, the two-stage control circuit does not adjust the timing of the pulsed square waves, for example by forcing the correction angle theta θ to zero, when the converter drives the power line. The first stage of the two-stage control circuit is in the 558 branch while the second stage follows the branch 560 and branch 562 concurrently. The second stage branches 560 and 562 combines the weighted sum results of capacitor voltage deviation and line current deviation to feed to block 564 to generate pulsed square wave for the converter. The first stage branch 558 computes concurrently the correction angle theta θ to feed that to block 566 to generate pulsed square wave with appropriate timings.

Figure 6:
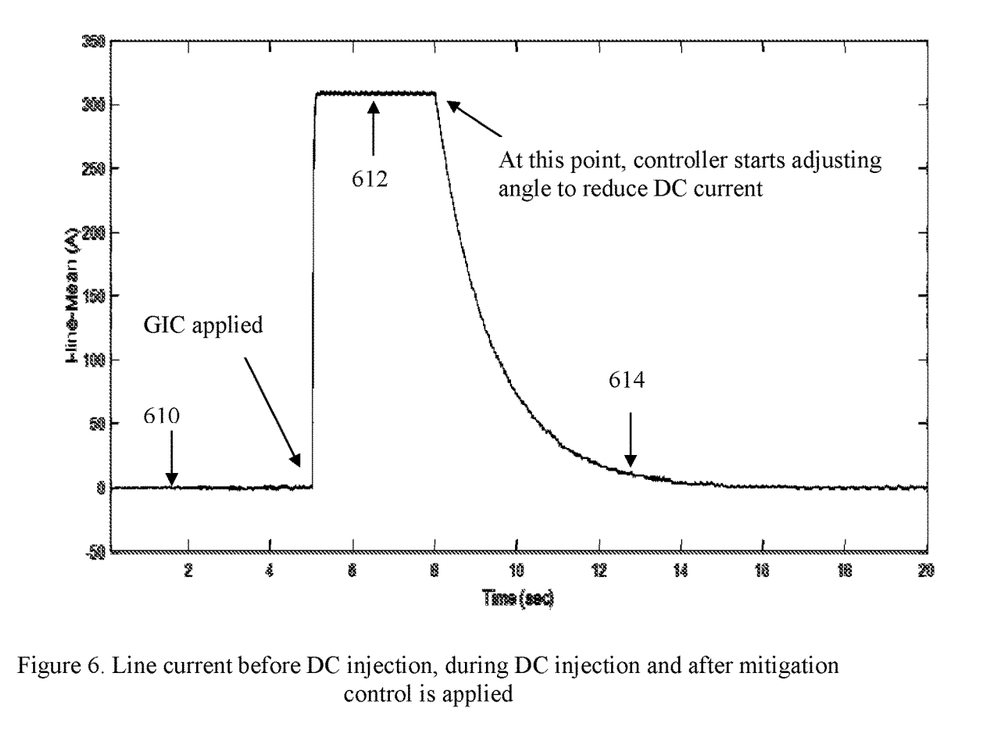
FIG. 6 shows the result of experiments on the line current before DC injection, during DC injection, and after mitigation control is applied.

A result of an experiment with this two-stage control circuit is presented in FIG. 6, which shows the line current before the DC injection event 610, after the DC injection event 612, and after the application of this mitigation control solution 614. This shows the effectiveness of the detection method and the mitigation method. The I_line_Mean (line current mean value) on the y-axis surges during a simulated DC injection event, and it is brought back down to normal value after the mitigation method is applied.

Figure 7A:
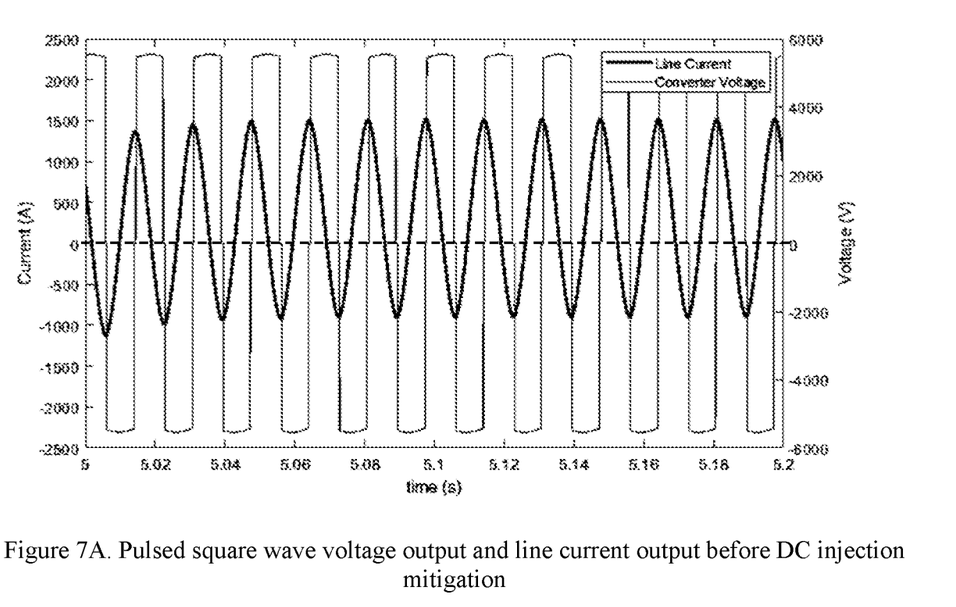
FIG. 7A and FIG. 7B show the pulsed square wave of voltage and the line current before and after DC injection mitigation.
Figure 7B:
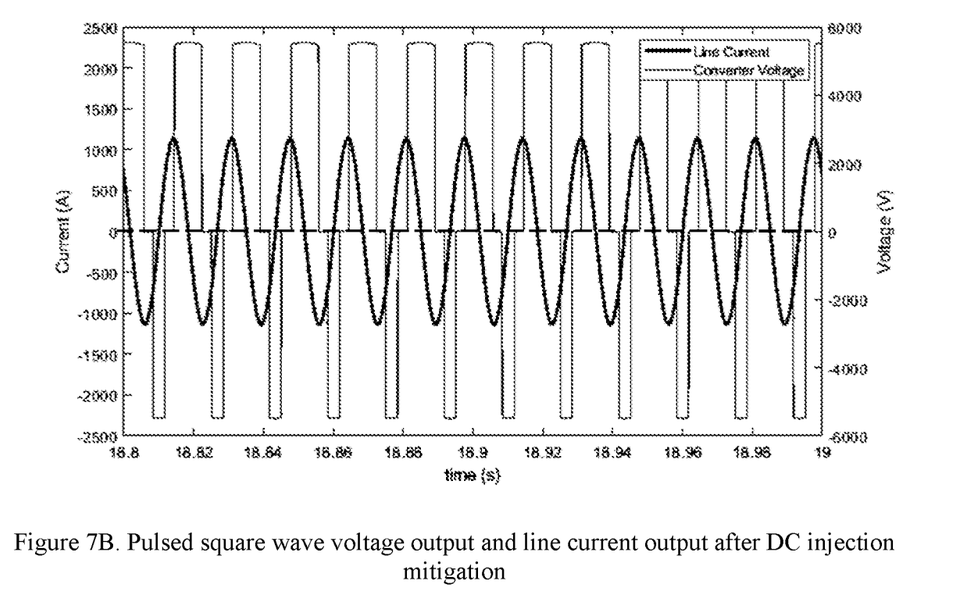

More experimentation results are presented in FIG. 7A and FIG. 7B. The y-axis has two sets of values, one is the pulsed square wave in voltage and the other is the line current in ampere. And FIG. 7A is before the mitigation control is applied and FIG. 7B is after the mitigation control is applied.

In FIG. 7A, the sinusoidal current is more positive than negative as a result of DC injection, asymmetrically and roughly between 1500 A and −1000 A. FIG. 7B shows that the current is symmetrical after the mitigation control circuit is applied. Note that in FIG. 7B the negative cycle of the generated voltage has a smaller duration, which corresponds to the value of $t_4-t_3$ shown in FIG. 4. In the example shown, the amplitudes of the positive and negative cycle are the same. The $t_1$ and $t_2$ are symmetrical within its positive half cycle and the $t_3$ and $t_4$ are symmetrical within its negative half cycle.

Figure 8:
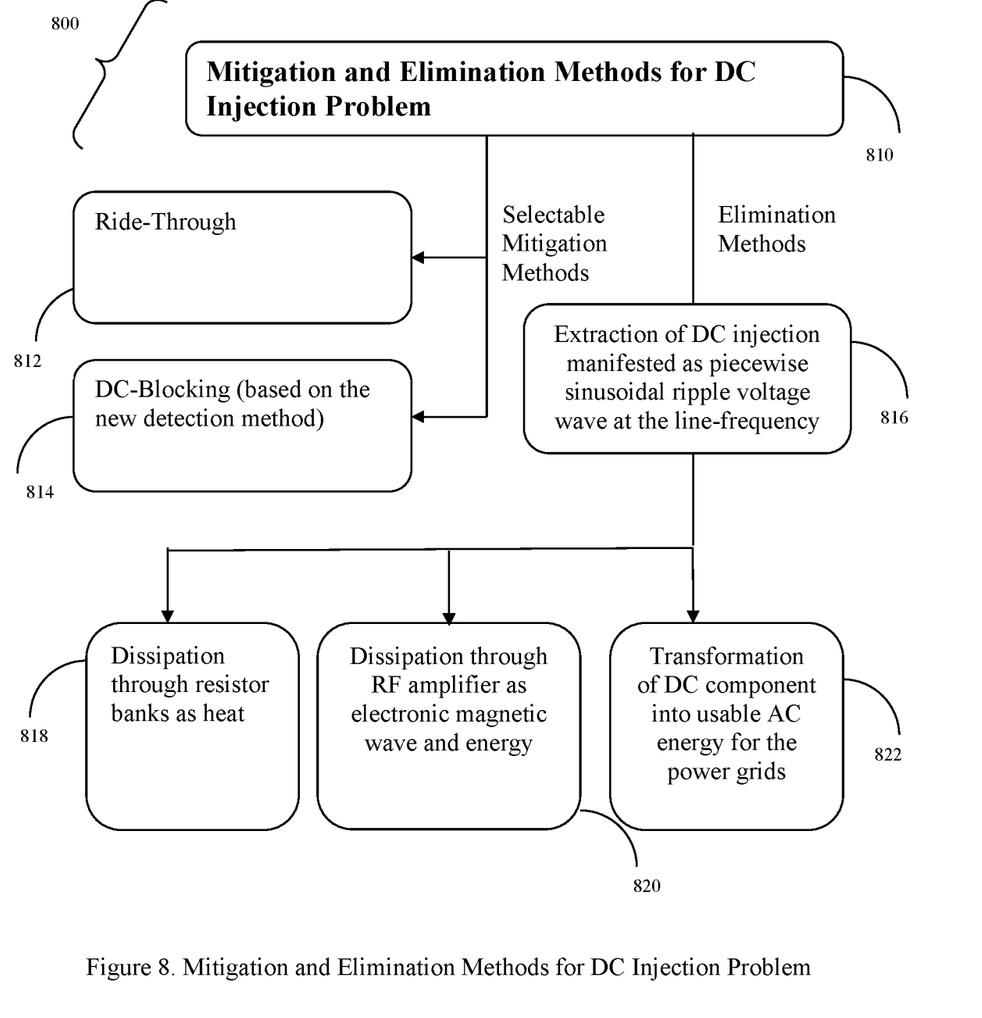
FIG. 8 provides a simple taxonomy of the mitigation methods and elimination methods for the DC injection problem in this application.

FIG. 8 shows the mitigation and elimination methods for the DC injection problem. The two mitigation methods on the left-hand side include the ride-through method 812 and DC-blocking method 814. It is important to allow the utilities to be able to select the default ride-through method 812, which would not engage mitigation control shown in FIG. 5A to deal with DC injection problems. This controllability allows the utilities to deploy the new functionalities to the field incrementally to protect the existing investment. The mitigation control in FIG. 5A, based on the observed ripple voltage, was presented earlier in this application and is referred to herein as "DC blocking".

On the right-hand side of FIG. 8 three dissipation/consumption methods 818 820 822 are shown that provide relief to the power grid for this DC injection problem. This DC injection component has to be extracted first 816. It can then be consumed in the form of heat dissipation 818 or electromagnetic wave irradiation 820. It also can be transformed and synchronized 822, phase-wise, with the power grid and re-inserted into the grid to become useful energy.

Figure 9:
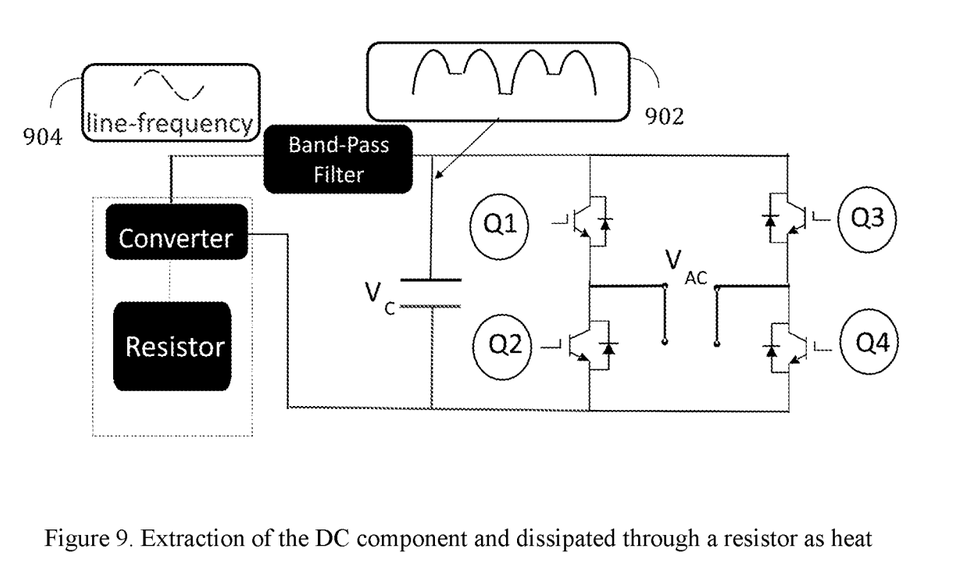
FIG. 9 is an example implementation of a dissipation method in the form of heat energy using resistor.

FIG. 9 shows an example of resistive dissipation design that can dissipate the energy as heat with proper cooling mechanism. On the right-hand side, it depicts the basic diagram of a full-wave inverter that converts DC to AC and vice versa. The Vac is the line voltage from the power grid. The operation is accomplished with alternating operations between IGBT (insulated-gate bipolar transistor) transistor pairs Q1-Q4 and Q2-Q3 in a fashion that the voltages on the DC capacitor is maintained and controlled in a predetermined range. The DC current bias on the AC, in this diagram, is positive, and consequently there is more current injected to the capacitor when commutating happens on the Q1 and Q4 pair. The excess on the voltage in the capacitor during the Q1-Q4 operation can be compensated during the Q2-Q3 operation. The voltage $V_C$ of the coupling capacitor is shown to have a ripple in 902. The extracted DC component after the band-pass filter is shown in 904 and is then used and converted to heat with a resistor bank.

Figure 10:
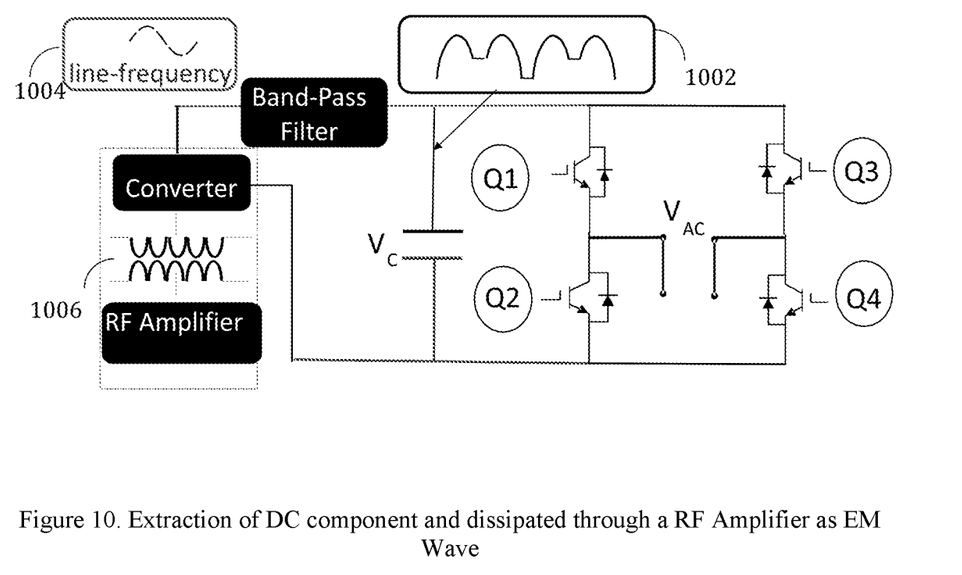
FIG. 10 is an example implementation of a dissipation method in the form of electromagnetic wave energy using RF amplifier.

FIG. 10 shows a RF (radio frequency) amplifier-based design can dissipate the energy by irradiation together with the use of transformer 1006 and antenna to operate in an environment that meets EM emission standards. Note that this is very similar to the design of FIG. 9 with the exception of how the extracted DC component is dissipated. The full-wave inverter on the right-hand side operates the same as that was explained above in FIG. 9. The voltage $V_C$ of the coupling capacitor is shown to have a ripple in 1002. The extracted DC component after the band-pass filter is shown in 1004 and is then used and converted to electromagnetic wave energy with a transformer and a RF amplifier.

Figure 11:
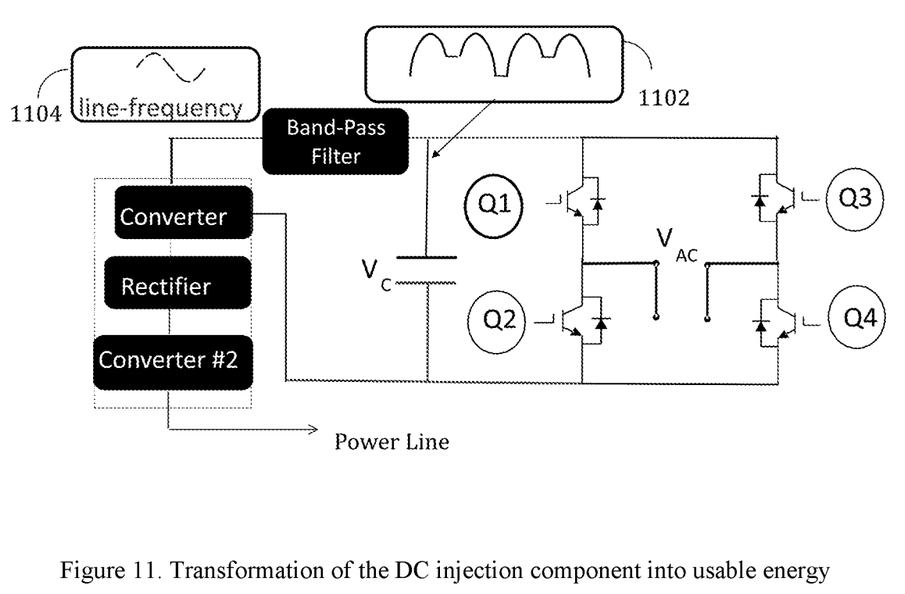
FIG. 11 is an example implementation of a transformation method in the form of energy harvesting using a rectifier and a second converter.

FIG. 11 shows an inverter type design can transform the ripple energy into AC form that is synchronized with the AC power grid and can then be added to the AC power grid. Note that this is very similar to the design of FIG. 9 with the exception of how the extracted DC component is used. The full-wave inverter on the right-hand side operates the same as that was explained above in FIG. 9. The voltage $V_C$ of the coupling capacitor is shown to have a ripple in 1102. The extracted DC component after the band-pass filter is shown in 1104 and is then rectified, optionally, and converted again using a second converter. It is then fed back to the power grid synchronously.

The methods, devices, processing, and logic described above may be implemented in many different ways and in many different combinations of hardware and software. For example, electronic circuitry or a controller may be configured with hardware and/or firmware to perform the various functions described. All or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. The implementations may be distributed as circuitry among multiple system components, such as among multiple processors and memories, optionally including multiple distributed processing systems.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium.

The foregoing description, for purposes of explanation, uses specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications. They thereby enable others skilled in the art to best utilize the invention and various embodiments with various modifications as are suited to the particular use contemplated. For example, while the detection, mitigation, and elimination of DC component have been illustrated using three-phase power transmission systems, the principles described are equally applicable to any alternating current transmission configuration. That includes two-phase, three-phase, four-phase or any polyphase configuration. The examples are thus illustrative and non-limiting. It is intended that the following claims and their equivalents define the scope of the invention.

What is claimed is:

1. An apparatus to mitigate direct current (DC) injected into a power line carrying an alternating current (AC), comprising:
    a full-wave DC-AC inverter/converter configured to detect the DC on the power line; and
    a two-stage pulsed square wave generator configured to generate a plurality of cycles of pulsed square waves each cycle including a positive-going square wave and a negative-going square wave, wherein a timing of the positive-going square wave and a timing of the negative-going square wave in each cycle are adjusted based on a direction and a magnitude of the detected DC to counter-balance the DC, wherein the two-stage pulsed square wave generator comprises:
        a first stage circuit configured to compute a correction angle θ based on the direction and the magnitude of the detected DC; and
        a second stage circuit configured to determine a turn-on time and a turn-off time of the positive-going square wave and a turn-on time and a turn-off time of the negative-going square wave based on the correction angle θ, and to generate the positive-going square wave and the negative-going square wave based on the respective turn-on times and turn-off times.

2. The apparatus of claim 1, wherein the full-wave DC-AC inverter/converter is configured to detect the DC as a piecewise sinusoidal ripple voltage at a line frequency of the AC, and the first stage circuit is configured to compute the correction angle θ by being configured to compare the piecewise sinusoidal ripple voltage against a reference value to compute the correction angle θ.

3. The apparatus of claim 2, wherein the reference value is non-zero.

4. The apparatus of claim 1, wherein the second stage circuit is further configured to compare a capacitor voltage of the detected DC with a reference voltage in a converter to determine an amplitude of the pulsed square waves before injecting the pulsed square waves to the power line.

5. The apparatus of claim 1, wherein the second stage circuit comprises a phase locked loop (PLL) configured to lock on a frequency of the AC on the power line and to shift a phase of an output of the PLL to determine a frequency and a phase of the pulsed square waves.

6. The apparatus of claim 1, wherein the correction angle θ ranges from 0 to 90 degrees, wherein when the correction angle θ is 0 degrees, the two-stage pulsed square wave generator is further configured to generate the plurality of cycles of pulsed square waves without an adjustment to the timing of the positive-going square wave and the timing of the negative-going square wave in each cycle, and wherein when the correction angle θ is 90 degrees, the two-stage pulsed square wave generator is further configured to eliminate one of the positive-going square wave or the negative-going square wave in each cycle.

7. The apparatus of claim 1, wherein the correction angle θ is zero if the magnitude of the detected DC is zero.

8. The apparatus of claim 1, wherein the two-stage pulse square wave generator is further configured to generate the plurality of cycles of pulsed square waves to drive a converter and for the converter to drive the power line.

9. The apparatus of claim 8, wherein the two-stage pulse square wave generator is further configured to enable or disable adjustments to the timing of the positive-going square waves and the timing of the negative-going square waves when the plurality of cycles of pulsed square waves is generated to drive the converter and for the converter to drive the power line to counter-balance the DC.

10. A method of mitigating by a power converter direct current (DC) injected into a power line carrying an alternating current (AC), comprising:
    detecting, by a full-wave DC-AC inverter/converter of the power converter, the DC on the power line to generate a detected DC; and
    generating, by the power converter, a plurality of cycles of pulsed square waves each cycle including a positive-going square wave and a negative-going square wave, wherein a timing of the positive-going square wave and a timing of the negative-going square wave in each cycle are adjusted based on a direction and a magnitude of the detected DC; and
    applying, by the power converter, the plurality of cycles of pulsed square waves to the power line to counter-balance the DC injected
    wherein generating the plurality of cycles of pulsed square waves comprises:
        computing a correction angle θ based on the direction and the magnitude of the detected DC;
        determining a turn-on time and a turn-off time of the positive-going square wave and a turn-on time and a turn-off time of the negative-going square wave based on the correction angle θ; and
        generating the positive-going square wave and the negative-going square wave based on the respective turn-on times and turn-off times.

11. The method of claim 10, wherein detecting, by the power converter, the DC on the power line comprises detecting the DC as a piecewise sinusoidal ripple voltage at a line frequency of the AC, and wherein computing the correction angle θ comprises comparing the piecewise sinusoidal ripple voltage against a reference value to compute the correction angle θ.

12. The method of claim 11, wherein the reference value is non-zero.

13. The method of claim 10, wherein the correction angle θ ranges from 0 to 90 degrees, wherein when the correction angle θ is 0 degrees, generating the positive-going square wave and the negative-going square wave based on the respective turn-on times and turn-off times comprises generating the plurality of cycles of pulsed square waves without an adjustment to the timing of the positive-going square wave and the timing of the negative-going square wave in each cycle, and wherein when the correction angle θ is 90 degrees, generating the positive-going square wave and the negative-going square wave based on the respective turn-on times and turn-off times comprises eliminating one of the positive-going square wave or the negative-going square wave in each cycle.

14. The method of claim 10, wherein computing the correction angle θ based on the direction and the magnitude of the detected DC comprises determining the correction angle θ to be zero if the magnitude of the detected DC is zero.

15. The method of claim 10, wherein the turn-on time and the turn-off time of the positive-going square wave are symmetrical within a positive half cycle of each cycle, and wherein the turn-on time and the turn-off time of the negative-going square wave are symmetrical within a negative half cycle of each cycle.

16. The method of claim 10, wherein generating, by the power converter, the plurality of cycles of pulsed square waves comprises:
    comparing a capacitor voltage of the detected DC with a reference voltage by the power converter to determine an amplitude of the pulsed square waves.

17. The method of claim 10, wherein generating, by the power converter, the plurality of cycles of pulsed square waves comprises:
    locking to a frequency of the AC on the power line to generate a locked frequency; and
    shifting a phase of the locked frequency to generate a frequency and a phase of the pulsed square waves.

18. The method of claim 10, further comprising enabling or disabling adjusting the timing of the positive-going square waves and the timing of the negative-going square waves when generating the plurality of cycles of pulsed square waves by the power converter and when applying to the power line to counter-balance the DC.

\* \* \* \* \*